March 19, 1940.  M. LANGER  2,194,046
ARMATURE FOR ELECTRIC MOTORS
Filed Aug. 8, 1938
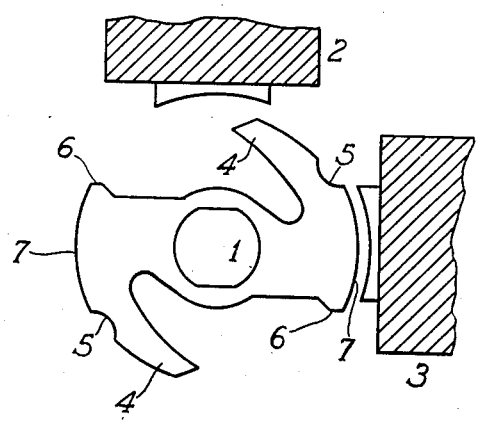
INVENTOR.
MAX LANGER
BY
ATTORNEY.

Patented Mar. 19, 1940

2,194,046

UNITED STATES PATENT OFFICE 2,194,046

ARMATURE FOR ELECTRIC MOTORS

Max Langer, Berlin-Hermsdorf, Germany, assignor to "Fides" Gesellschaft für die Verwaltung und Verwertung von gewerblichen Schutzrechten mit beschränkter Haftung, Berlin, Germany Application August 8, 1938, Serial No. 223,588
In Germany August 25, 1937

3 Claims. (Cl. 172—36)

The present invention concerns a laminated armature without a winding for motors, in particular for motors with single step control for working selectors in distant communication.

The purpose of the invention is to make such an armature which meets the demands which are placed on a selective motor and is stepped on by individual impulses. If such motors are provided with two energizing coils displaced by 90°, the armature must be effectively pulled round and stopped.

The present armature is laminated and has a shape which is suitable for forward motion with a suitable impulse curve and load curve. Further, this shape has a favorable braking moment, for, while the present armature is subjected to an increasing braking force to halt its rotation accurately at the braking point, it also supports the turning moment for the forward motion slightly, thereby to prevent the stopping from being too abrupt.

In the drawing, an embodiment of the new armature is shown.

The shaft of the armature which is not shown, lies in the opening in the armature laminae indicated by 1. By 2 and 3 the energizing coils displaced 90° with respect to one another are indicated. The pole face of the armature is divided into two armature poles indicated by 7 and the projections 4. Between the armature pole 7 and the projections 4, nicks 5 are provided by which an accurate setting of the armature is made possible. The projections 4 lie in the direction of rotation and insure the turning of the armature. The projections lie on a radius which is smaller than the radius of the armature pole 7. By means of these projections it is attained that a considerable turning moment is produced by the attracting pole in the large section of the armature. By 6 the small auxiliary pole is indicated which favorably influences the turning moment for the braking operation.

What is claimed is:

1. A flat lamina for a laminated armature of a motor, comprising pole portions each extending substantially radially from the axis of rotation of the armature and each having at its outer end a portion projecting therefrom substantially arcuately in the direction of rotation of the armature, and a nick cut out of each projecting portion adjacent to its corresponding pole portion thereby to clearly define the leading edge of that pole portion.

2. A motor having a laminated armature which is rotated by a shifting field but may be stopped in any of certain predetermined positions by said shifting field becoming static, the laminae of said armature being substantially flat, each lamina comprising a plurality of pole portions each extending substantially radially from the axis of rotation of the armature and each having at its outer end a portion projecting therefrom substantially arcuately in the direction of rotation of the armature, a nick cut out of each projecting portion adjacent to its corresponding pole portion to more clearly define the outer end of said pole portion and thereby to assist said pole portion in locating itself accurately in a stopping position responsive to said shifting field becoming static.

3. A motor as claimed in claim 2 wherein the laminae of the armature also have at the outer end of each pole portion another portion projecting therefrom away from the direction of rotation of the armature and forming a trailing edge which when influenced by the field tends to sustain the rotation of the armature through a stopping position.

MAX LANGER.